United States Patent
Jorgensen et al.

(10) Patent No.: US 12,473,461 B2
(45) Date of Patent: Nov. 18, 2025

(54) MOISTURE BARRIER MATERIAL

(71) Applicants: NITTO, INC., Lakewood, NJ (US); NITTO DENKO CORPORATION, Ibaraki (JP)

(72) Inventors: Derek Jorgensen, Lakewood, NJ (US); Chad Joldersma, Lakewood, NJ (US)

(73) Assignees: Nitto, Inc., Teaneck, NJ (US); Nitto Denko Corporation, Ibaraki (JP)

( * ) Notice: Subject to any disclaimer, the term of this patent is extended or adjusted under 35 U.S.C. 154(b) by 995 days.

(21) Appl. No.: 16/303,921

(22) PCT Filed: May 23, 2017

(86) PCT No.: PCT/US2017/033999
§ 371 (c)(1),
(2) Date: Nov. 21, 2018

(87) PCT Pub. No.: WO2017/205372
PCT Pub. Date: Nov. 30, 2017

(65) Prior Publication Data
US 2020/0317959 A1    Oct. 8, 2020

Related U.S. Application Data

(60) Provisional application No. 62/340,225, filed on May 23, 2016.

(51) Int. Cl.
*C09J 7/25* (2018.01)
*C08K 5/521* (2006.01)
(Continued)

(52) U.S. Cl.
CPC .............. *C09J 7/25* (2018.01); *C08L 75/06* (2013.01); *C09J 9/00* (2013.01); *C09J 107/00* (2013.01);
(Continued)

(58) Field of Classification Search
CPC .. C08K 5/0066; C08K 5/521; C09J 2301/408; C09J 2409/00; C09J 2475/006;
(Continued)

(56) References Cited

U.S. PATENT DOCUMENTS 3,036,945 A * 5/1962 Souza ................ B32B 27/00
                                                        156/219
3,380,938 A   4/1968 Jack et al.
(Continued)

FOREIGN PATENT DOCUMENTS

JP   2001-332843 A   11/2001
JP   2007-529652 A   10/2007
(Continued)

OTHER PUBLICATIONS

Standard Test Method for Water Vapor Transmission of Pressure-Sensitive Tapes, ASTM D3833 (2001) (Year: 2001).*
(Continued)

*Primary Examiner* — Scott R. Walshon
(74) *Attorney, Agent, or Firm* — Knobbe, Martens, Olson & Bear, LLP

(57) ABSTRACT

A moisture barrier material including a carrier, an adhesive layer formed on at least one surface of the carrier, and a release treated liner, wherein the moisture barrier material has a non-planar shape.

15 Claims, 4 Drawing Sheets

(51) Int. Cl.
  *C08L 75/06* (2006.01)
  *C09J 9/00* (2006.01)
  *C09J 107/00* (2006.01)
  *C09J 109/06* (2006.01)
  *C08K 5/00* (2006.01)

(52) U.S. Cl.
  CPC ........... *C09J 109/06* (2013.01); *C08K 5/0066* (2013.01); *C08K 5/521* (2013.01); *C08L 2201/02* (2013.01); *C08L 2201/14* (2013.01); *C09J 2301/408* (2020.08); *C09J 2409/00* (2013.01); *C09J 2427/005* (2013.01); *C09J 2475/006* (2013.01)

(58) Field of Classification Search
  CPC ....... C09J 7/25; C09J 7/383; C09J 9/00; C09J 2301/16; C09J 2301/10; C09J 2301/20; C09J 2301/30; G09F 3/02
  See application file for complete search history.

(56) References Cited

U.S. PATENT DOCUMENTS

| | | | |
|---|---|---|---|
| 5,516,581 A | 5/1996 | Kreckel et al. | |
| 6,818,093 B1* | 11/2004 | Taal | C09J 153/02 156/334 |
| 7,185,588 B2 | 3/2007 | Clark et al. | |
| 2002/0119292 A1* | 8/2002 | Venkatasanthanam | B29C 48/21 264/564 |
| 2004/0070156 A1 | 4/2004 | Smith et al. | |
| 2005/0003180 A1 | 1/2005 | Kondos | |
| 2005/0196590 A1 | 9/2005 | Seth et al. | |
| 2007/0026180 A1* | 2/2007 | Lavature | C09J 7/25 428/40.1 |
| 2009/0110856 A1 | 4/2009 | Gummaraju et al. | |
| 2011/0059155 A1* | 3/2011 | Aoyagi | A61F 13/023 424/443 |
| 2011/0067799 A1* | 3/2011 | Mussig | C09J 7/38 156/324 |
| 2012/0231267 A1 | 9/2012 | Ootake et al. | |
| 2012/0325282 A1 | 12/2012 | Snow et al. | |
| 2013/0052461 A1 | 2/2013 | Muta et al. | |
| 2013/0071589 A1* | 3/2013 | Hannington | B32B 27/32 264/293 |
| 2013/0152262 A1 | 6/2013 | Bedetti et al. | |
| 2013/0164471 A1* | 6/2013 | Suzuki | B32B 3/10 428/323 |
| 2013/0337261 A1* | 12/2013 | Muta | E04F 13/075 428/355 R |
| 2015/0353776 A1* | 12/2015 | Gawryla | C09J 7/20 428/317.7 |
| 2017/0182753 A1* | 6/2017 | Nakashima | B32B 17/00 |

FOREIGN PATENT DOCUMENTS

| | | | |
|---|---|---|---|
| JP | 2011-032734 A | 2/2011 | |
| JP | 2013-245351 A | 12/2013 | |
| WO | WO-2015186810 A1 * | 12/2015 | ............... B32B 1/00 |

OTHER PUBLICATIONS

International Search Report for PCT/US2017/033999 dated Sep. 15, 2017 [PCT/ISA/210].
Written Opinion for PCT/US2017/033999 dated Sep. 15, 2017 [PCT/ISA/237].
Extended European Search Report for European Application No. 17803418.7 dated Nov. 22, 2019.
Office Action issued in Japanese Patent Application No. 2018-561049 dated Jun. 24, 2021 in 8 pages.
Office Action issued in Japanese Patent Application No. 2018-561049 dated Feb. 17, 2022 in 6 pages.

* cited by examiner

FIG. 1A
--Conventional--
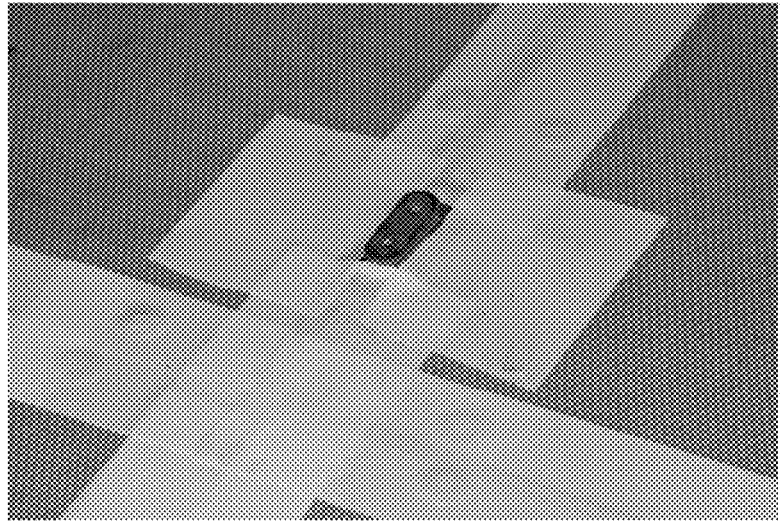
FIG. 1B
--Conventional--
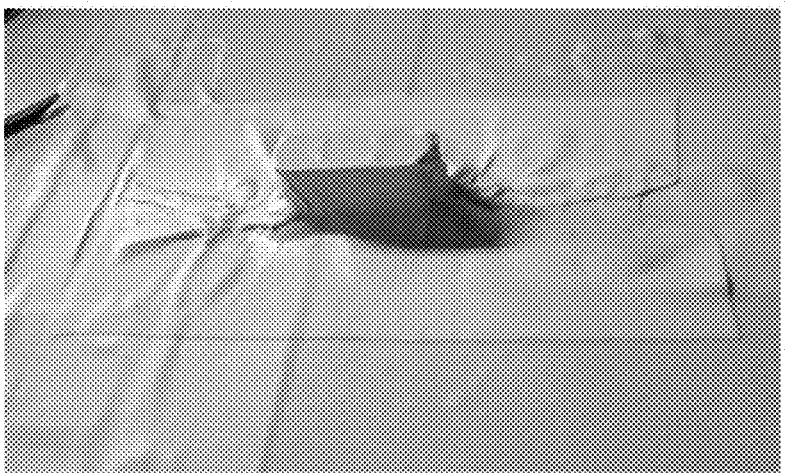

MOISTURE BARRIER MATERIAL

RELATED APPLICATION

This is a National Stage of PCT/US2017/033999 filed Mar. 23, 2017, which claims the benefit of U.S. Provisional Patent Application Ser. No. 62/340,225, filed May 23, 2016, the entire disclosures of which is incorporated herein in its entirety by reference.

FIELD OF THE INVENTION

The present disclosure relates generally to a moisture barrier material for various applications that can be directly adhered to various members. In particular, the present disclosure relates to a moisture barrier material for direct adhesion to surfaces, such as floor panels having brackets inside transportation vehicles, such as airplanes, boats, ships and the like. The present disclosure can be applied to technologies of any industry, including the automobile industry, that has shaped seams, joints, or other non-planar surfaces that need protection. The present disclosure can use any material that can be shaped.

BACKGROUND OF THE DISCLOSURE

Conventional moisture barrier tapes include an adhesive coated on a backing or carrier. The moisture barrier tape can also include a protective liner on the adhesive that is removed when the tape is applied to the surface. In the aerospace industry, certain areas of an aircraft, such as the gutter area, are prone to moisture build up and corrosion. The gutter area is found at the entryways of the aircraft where passengers enter or exit, and typically coincide with the galley areas. The floor panels for these areas have recessed channels to allow for liquids to flow into drains, and thus experiences a high degree of moisture compared to other areas. Accordingly, a problem arises with applying a conventional moisture barrier tape in a manner that creates a good seal with these recessed channels because it is difficult to seal the tape into the drainage area, often requiring heating with a heat gun and forming the seal by hand.

In addition, in an aircraft, brackets are raised metal pieces on the floor used to mount various structural components within the cabin. These brackets must be sealed with tape to protect them from moisture, taking care that optimal sealing contact is made between the tape and the bracket to avoid any air pockets or channels into where moisture can flow. However, traditionally, a flat moisture barrier tape does not effectively contour to the shape of the brackets, and thus, a heat gun must be used to heat the tape and then push the tape down around the brackets. It is dangerous for technicians to do this as heat temperatures are high (about 160° C.) and technicians in a rush may forgo hand protective equipment. It is also time consuming, taking an average of 15-20 minutes, sometimes over 30 minutes, per bracket.

In addition, because the conventional moisture barrier tape does not contour well around the bracket, pressing the conventional moisture barrier tape to shape it onto the brackets (as well as the heating discussed above) is required. Furthermore, it is difficult to find a suitable carrier and liner that can withstand the heating and stretching during the shaping process. Conventional carriers lack the elasticity required for good deformation into desired shapes, such as brackets, of the surface to be covered.

A moisture-proof material, for example, using a polyurethane substrate (U.S. Pat. No. 9,546,303) is known. However, the moisture-proof material does not overcome the above problems.

SUMMARY

The present disclosure has been made in consideration of the above-mentioned situation. The present disclosure relates to a moisture barrier material for irregularly shaped surfaces. That is, the moisture barrier material is custom formed to shapes that are otherwise difficult for flat tapes to cover. The moisture barrier material of the present disclosure also speeds up the application process, is safer and simpler to apply, and results in more consistent products. The moisture barrier material of the present disclosure also standardizes the application process.

The moisture barrier material of the present disclosure overcomes problems of conventional moisture barrier tapes used in the flat form because the moisture barrier material of the present disclosure has more elasticity and is easier to shape with heat. In addition, the moisture barrier material of the present disclosure allows for the heat shaping process to be safely completed before application. For example, instead of the moisture barrier material of the present disclosure being shaped with heat during application on a bracket, it can be pre-formed in a custom shape using heat in advance of application.

Specifically, an embodiment of the moisture barrier material of the present disclosure includes a carrier and an adhesive. In another embodiment, the adhesive can be lined with a liner that functions to protect the adhesive during the heat shaping process. To apply the moisture barrier material of the present disclosure, the liner need only be peeled.

Advantages of the moisture barrier material compared to conventional moisture barrier tapes in the aerospace industry, for example, are the ability to be custom shaped and the ability to be peeled and stuck without the need to apply heat during application. Another advantage is simplicity. When using the conventional moisture barrier tape, application of a plurality of tape segments of the same tape is required across the entire moisture preventing application. However, only a single custom-shaped moisture barrier material of the present disclosure is needed to cover and protect the surface.

Other features, objects, and advantages of the present disclosure are apparent in the detailed description that follows. It should be understood, however, that the detailed description, while indicating preferred embodiments of the disclosure, are given by way of illustration only, not limitation. Various changes and modifications within the scope of the invention will become apparent from the detailed description to those skilled in the art.

BRIEF DESCRIPTION OF THE DRAWINGS

FIGS. 1A and 1B are photographs showing the sealing of a mounting bracket with a conventional moisture barrier tape.

FIG. 4A shows the mounting bracket to be sealed; FIG. 4B shows a 3D scan of parameters of the mounting bracket; and FIG. 4C shows a moisture barrier material that has been thermally formed according to the measured parameters.

FIG. 5A shows the gutter area to be sealed; FIG. 5B shows a 3D scan of parameters of the gutter area; and FIG. 5C shows a moisture barrier material that has been thermally formed according to the measured parameters.

DETAILED DESCRIPTION

It is to be understood that the present disclosure is not limited to the particular embodiments described, as such aspects may vary. The moisture barrier material of present disclosure provides protection for non-planar shaped objects due to its elasticity, which enables it to be thermally formed into a desired shape that allows for easy application to a surface.

The present disclosure is explained in the following by referring to preferable embodiments thereof.

Figure 2:
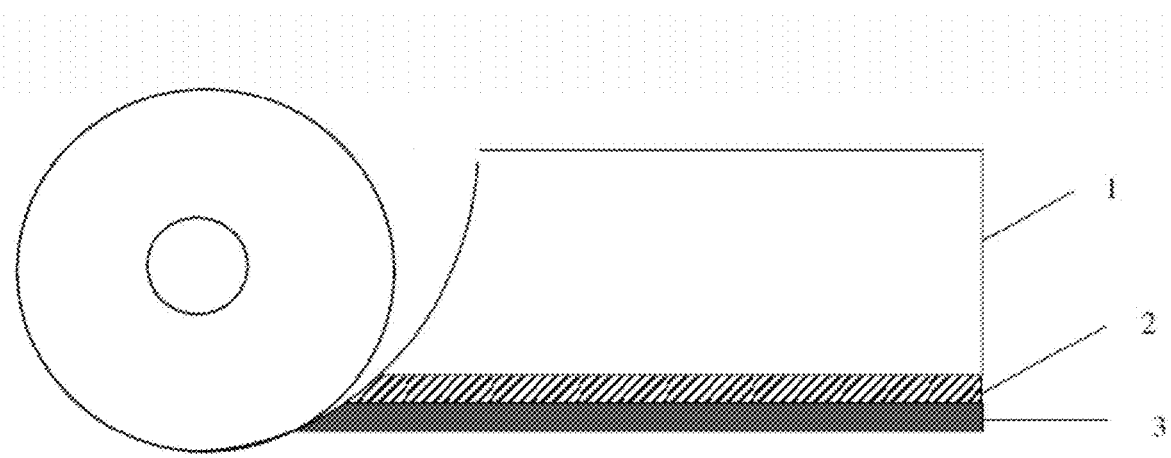
FIG. 2 is a schematic view of one embodiment of the moisture barrier material of the present disclosure.
Figure 3:
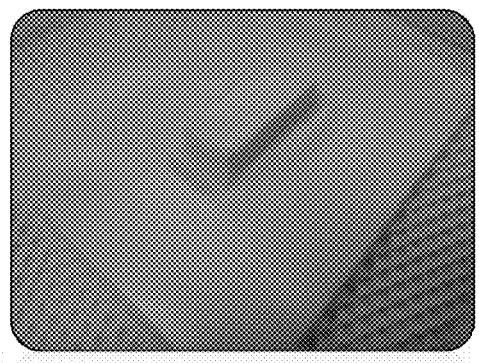
FIG. 3 is a photograph of one embodiment of the moisture barrier material of the present disclosure that has been heat formed.
Figure 4A:
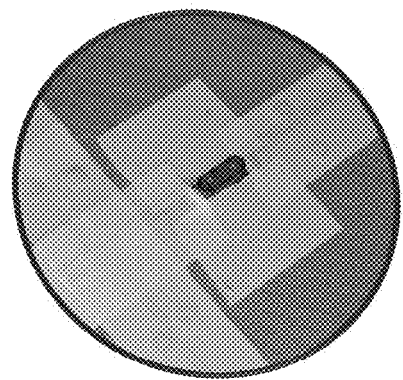
FIGS. 4A to 4C show one embodiment of forming the moisture barrier material of the present disclosure for sealing a mounting bracket.
Figure 4B:
Figure 4C:
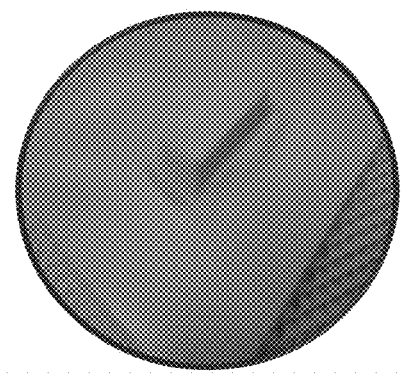
Figure 5A:
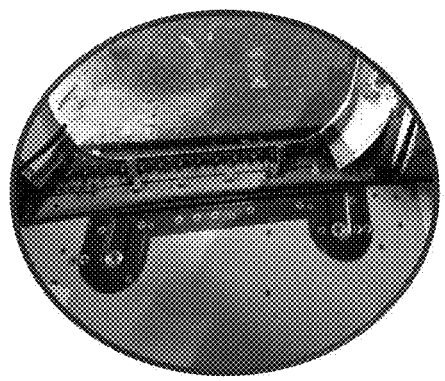
FIGS. 5A to 5C show one embodiment of forming the moisture barrier material of the present disclosure for sealing a gutter area.
Figure 5B:
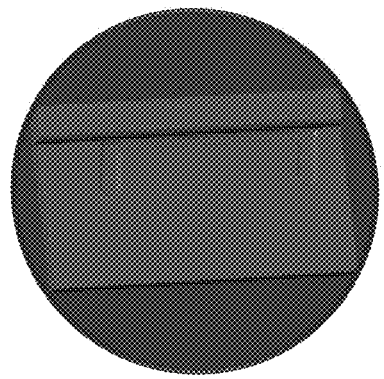
Figure 5C:
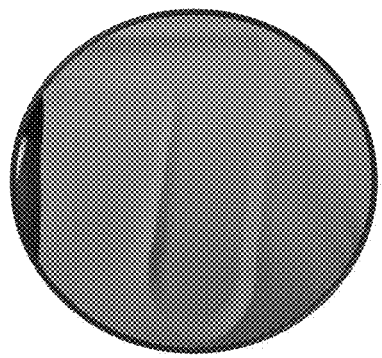

As shown in FIG. 2, a moisture barrier material of the present disclosure includes a carrier 1, an adhesive 2 formed on at least one surface of the carrier 1, and a stretchable liner 3. The moisture barrier material of the present disclosure may have a planar or non-planar form. For example, the moisture barrier material can be in a flat form, such as in a tape form, or in a non-planar or shaped form.

In an aspect of the present disclosure, the moisture barrier material can be used in the following manner. There is a non-planar shaped object which a user desires to protect from moisture on at least one surface. The user first measures parameters of the surface that is desired to be protected using a method known in the art, such as a 3D scanner or engineering drawings from the part Original Equipment Manufacturer or customer. Custom-shaped dies are made based on the parameters obtained and placed into a thermal forming machine. A sheet including a carrier, adhesive, and liner is then fed into the machine, which applies heat to the sheet and deforms it into the shape of the die to obtain the moisture barrier material. The structure of the sheet can vary. For example, the sheet can include a single carrier layer or a plurality of carrier layers. Another variation of the sheet includes a carrier but no adhesive or liner. When the sheet includes only a carrier, an adhesive is coated onto the carrier after the carrier has been thermally shaped. In addition, a liner can be further applied to the adhesive coated on the thermally shaped carrier. In other words, thermal forming can be applied to the carrier alone, or to the carrier coated with the adhesive and/or liner.

Specifically, the moisture barrier material of the present disclosure includes a carrier and an adhesive covering at least one side thereof. The moisture barrier material can be opaque, translucent, or transparent.

In one embodiment of the present disclosure, the carrier is thermoplastic. The carrier is any material that is conformable, e.g., a material that can be deformed using, for example, a die. Examples of such materials include a polyurethane, polytetrafluoroethylene (PTFE), polyamide, polyvinylidene fluoride (PVDF), polyvinyl chloride (PVC), polymethylpentene, polypropylene, and a foam. Preferably, the carrier is a polyurethane. While the polyurethane is not particularly limited, polyether-based polyurethane wherein the polyol component consists of polyether polyol, polyester-based polyurethane wherein the polyol component consists of polyester polyol, polycarbonate-based polyurethane wherein the polyol component consists of polycarbonate polyol and the like can be mentioned. Of these, polyester-based polyurethane is preferable from the aspects of strength, heat resistance and anchor property with an adhesive.

Examples of the polyol component of polyester-based polyurethane include polyester polyol comprised of a polycondensate of alcohols such as ethylene glycol, diethylene glycol, propylene glycol, butylene glycol, hexamethylene glycol, 1,4-butanediol, 1,6-hexanediol, 1,9-nonanediol, 2-methyl-1,3-propanediol, neopentyl glycol, 3-methyl-1,5-pentanediol and the like, and a dibasic acid such as adipic acid, azelaic acid, sebacic acid and the like, polycaprolactone polyol and the like. One or more kinds of polyol component can be used. From the aspect of water resistance of the moisture barrier material, polyester polyol comprised of polycondensate of one or more kinds of alcohols selected from the group consisting of 1,9-nonanediol, 2-methyl-1,3-propanediol, neopentyl glycol and 3-methyl-1,5-pentanediol, and one or more kinds of dibasic acid selected from the group consisting of adipic acid, azelaic acid and sebacic acid is (are) preferable.

As the polyisocyanate component of polyester-based polyurethane, a known aliphatic, alicyclic or aromatic organic isocyanate compound having two or more isocyanate groups in one molecule can be used. Examples of the aliphatic isocyanate compound include aliphatic diisocyanates such as butane-1,4-diisocyanate, hexamethylene diisocyanate, isopropylene diisocyanate, methylene diisocyanate, 2,2,4-trimethylhexamethylene diisocyanate, lysine diisocyanate, dimer diisocyanate wherein carboxyl group of dimer acid is inverted to an isocyanate group and the like. In addition, examples of the alicyclic isocyanate compound include alicyclic diisocyanates such as cyclohexane-1,4-diisocyanate, isophorone diisocyanate, norbornane diisocyanate, dicyclohexylmethane-4,4'-diisocyanate, 1,3-bis(isocyanatomethyl)cyclohexane, methylcyclohexane diisocyanate and the like. Furthermore, examples of the aromatic isocyanate compound include aromatic diisocyanates such as 1,5-naphthylene diisocyanate, 4,4'-diphenylmethane diisocyanate, 4,4'-diphenyldimethylmethane diisocyanate, 4,4'-dibenzyl diisocyanate, dialkyldiphenylmethane diisocyanate, tetraalkyldiphenylmethane diisocyanate, 1,3-phenylene diisocyanate, 1,4-phenylene diisocyanate, tolylene diisocyanate, xylylene diisocyanate, m-tetramethylxylylene diisocyanate and the like. As the polyisocyanate component, a trifunctional or more polyisocyanate compound such as adduct, isocyanurate, biuret and the like can also be used. One or more kinds of polyisocyanate component can be used. The polyisocyanate component is preferably an aliphatic and/or alicyclic isocyanate compound(s), from the aspect of yellowing resistance.

One or more kinds of polyurethane can be used for constituting the polyurethane film substrate. While the average molecular weight of polyurethane is not limited, the number average molecular weight (Mn) is generally 5,000-500,000, preferably 10,000-300,000.

The carrier is prepared by, for example, heat-melting and extrusion-molding pellets, or forming pellets into a film by a method such as calendaring and the like.

As the carrier, a commercially available product can be used. An example of a commercially available aromatic thermoplastic polyurethane film is X2313 NAT (trade name Dureflex®) from Bayer MaterialScience. Examples of a polyether-based polyurethane film substrate include MT2001 and the like from American Polyfilm, Inc. Examples of the polyester-based polyurethane film substrate include VLM4001, VLM3301 and VLM 3301, and the like from American Polyfilm, Inc.

The carrier may further include various additives, such as a flame retardant and a colorant. While the flame-retardant is not particularly limited, flame-retardants that can be used in the adhesive discussed below can be used. In addition, preferable examples of the flame retardant include mineral, such as aluminum hydroxide; organophosphorus, such as tricresyl phosphate; organohalogen, such as bis pentabromophenyl ethane; and heavy metal, such as antimony trioxide and antimony pentoxide. The thickness of the carrier is not particularly limited. However, the thickness of the carrier may be 0.0508 to 0.635 mm, preferably 0.1016 to 0.508 mm, and more preferably 0.4064 to 0.4572 mm. Additionally, the carrier can be a single or multi-layered film, or it may be a foam depending on the application.

In another embodiment of the present disclosure, the adhesive is any heat resistant adhesive. Examples include natural rubber adhesive, synthetic rubber adhesive, polyurethane adhesive, acrylic adhesive, silicone adhesive, and a hot-melt adhesive. The adhesive is preferably a synthetic rubber. Examples of commercially available synthetic rubbers include DC 14044 from Royal Adhesives and Sealants) and Globalprene 5516, 5517, 5518, 5525, and 5526 (styrene-isoprene block copolymer from LCY Elastomers LP). In addition, more than one type of adhesive may be used.

The thickness of the adhesive is not particularly limited. However, the thickness of the adhesive is 0.0127 to 0.127 mm, and preferably 0.0508 to 0.0635 mm, from the aspects of the moisture proof property of the moisture barrier and workability of re-adhesion of the moisture barrier. When it is not less than 0.0127 mm, the moisture proof property of the moisture barrier is more improved, and when it is not more than 0.127 mm, workability of re-adhesion of the moisture barrier becomes more advantageous.

The adhesive may further include various additives, such as a flame retardant and a colorant. While the flame-retardant is not particularly limited, a non-halogen flame-retardant is preferable from the environmental aspects. Known examples of the non-halogen flame-retardant include hydrated metal compound-based flame-retardant, inorganic compound-based flame-retardant, phosphorus flame-retardant, silicone-based flame-retardant, nitrogen compound-based flame-retardant and organic metal compound-based flame-retardant. Particularly, a phosphorus flame-retardant is preferable since it is superior in flame retardance-imparting effect, suppression of drip during burning, compatibility to environmental regulations and the like.

Examples of the hydrated metal compound-based flame-retardant include aluminum hydroxide, magnesium hydroxide, calcium hydroxide and the like. Examples of the inorganic compound-based flame-retardant include antimony compound (such as antimony trioxide and antimony pentoxide), zinc borate, zinc stannate, molybdenum compound, zinc oxide, zinc sulfide, zeolite, titanium oxide, nanofiller (montmorillonite (MMT), nano hydrated metal compound, silica), carbon nanotube, calcium carbonate and the like.

Examples of the phosphorus flame-retardant include phosphate esters, aromatic condensed phosphate esters, ammonium polyphosphates and the like. Specific examples of phosphate esters include triphenyl phosphate, tricresyl phosphate (TCP), cresyldiphenyl phosphate (CDP), 2-ethylhexyldiphenyl phosphate, triethyl phosphate (TEP), tri-n-butyl phosphate, trixylenyl phosphate, xylenyldiphenyl phosphate (XDP) and the like. Specific examples of aromatic condensed phosphate esters include resorcinol bisdiphenyl phosphate, bisphenol A bis(diphenyl phosphate), resorcinol bis(dixylenyl phosphate) and the like. Specific examples of ammonium polyphosphates include ammonium polyphosphate (APP), melamine-modified ammonium polyphosphate and coated ammonium polyphosphate. Here, coated ammonium polyphosphate is obtained by coating or microencapsulating ammonium polyphosphate with a resin to improve water resistance. The phosphate esters, aromatic condensed phosphate esters and ammonium polyphosphates can be used in combination. From among these, a combined use of a phosphate ester and an ammonium polyphosphate is preferable, since both the solid phase and the gaseous phase can be made flame-retardant by a combination of a flame retardance effect by char layer formation by the phosphate ester and a flame retardance effect by inert gas generation by the ammonium polyphosphate.

Examples of the silicone-based flame-retardant include dimethyl silicone, amino-modified silicone, epoxy-modified silicone and the like. Examples of the nitrogen compound-based flame-retardant include a hindered amine compound, melamine cyanurate, a triazine compound, a guanidine compound and the like. Examples of the organic metal compound-based flame-retardant include copper ethylenediaminetetraacetate, calcium perfluorobutanesulfonate and the like.

Examples of halogen flame retardant are chlorinated paraffin and organohalogen, such as bis pentabromophenyl ethane. Preferable flame retardants include hydrated metal compound-based flame retardant, such as aluminum hydroxide; organophosphorus flame retardant, such as tricresyl phosphate; organohalogen, such as bis pentabromophenyl ethane; and heavy metal flame retardant, such as antimony trioxide and antimony pentoxide. The flame retardant is preferably tricresyl phosphate or chlorinated paraffin. Commercially available flame retardants include tricresyl phosphate from Rit-Chem Co., Inc. and chlorinated paraffin such as Paroil 63 NR® from Dover Chemical Corporation. One or more kinds of flame retardants can be used.

While the amount of the flame-retardant to be used varies depending on the kind of the flame-retardant, generally, it is preferably less than 5 wt %, more preferably less than 3 wt %, still more preferably less than 2 wt %, particularly preferably less than 1 wt %, of the whole moisture barrier material, from the aspects of transparency of the moisture barrier material and suppression of a decrease in the cohesion strength of the adhesive layer. When a flame-retardant is mixed in a proportion of not less than 5 wt % of the whole moisture barrier material, transparency of the moisture-proof material decreases, and observation of the surface targeted for adhesion (adhered surface) through the moisture-proof material becomes difficult in an adhesion work, which tend to decrease the adhesion workability.

A preferred adhesive composition includes a synthetic rubber and a flame retardant. An example of a preferred adhesive composition includes a styrene-isoprene/styrene-butadiene copolymer and at least one of tricresyl phosphate or chlorinated paraffin as a flame retardant.

The adhesive can be covered with a liner until use. The liner is formed from a heat resistant material and is preferably stretchable or conformable. Additionally, the liner is peelable from the adhesive. The liner can be used to protect the adhesive during the heat shaping process of the moisture barrier. Examples of the liner include polyvinyl chloride, polyurethane, polymethylpentene, polypropylene, polyvinylidene fluoride, polyamide, and polytetrafluoroethylene. The liner is preferably polyvinyl chloride. Multi-layered liner (e.g., 2 layers or more composites) formed by lamination, coextrusion and the like, can be used.

In addition, at least one surface of the liner can be modified, for example, with a release treatment. Examples of the release treatment include depositing a layer of release agent on at least one surface of a liner. The release agent to be used for the release treatment is not particularly limited. For example, low-adhesive agents such as silicone-based release agents, fluorinated release agents (e.g., polytetrafluoroethylene, polychlorotrifluoroethylene, polyvinyl fluoride, polyvinylidene fluoride, tetrafluoroethylene hexafluoropropylene copolymer, chlorofluoroethylene vinylidene fluoride copolymer and the like), nonpolar polymer release agents (e.g., olefin-based resin such ash polyethylene, polypropylene and the like), long chain alkyl-based release agents and the like can be used. The release agent is preferably silicone-based. The release agent may be used alone or two or more kinds thereof can be used in combination. Commercially available release agents include a polysiloxane from MPI Technologies, Inc.

The size of the liner is not particularly limited and the size can vary depending on application. For example, the planar size of the liner may be larger than that of the carrier and/or adhesive. The thickness of the liner is not particularly limited. However, the thickness of the liner can be 0.0127 to 0.254 mm, and preferably 0.0127 to 0.127 mm. The liner may further include additives, such as a colorant. Preferably, the colorant is a blue or light blue. The liner has a 100% modulus of 22 to 36.8 N/2 cm, preferably 32.1 to 33.5 N/2 cm, in the machine direction and 20 to 34.8 N/2 cm, preferably 27.7 to 28.7 N/2 cm, in the transverse direction; a tensile strength of 34.6 to 66 N/2 cm, preferably 53.0 to 55.0 N/2 cm, in the machine direction and 27.4 to 58.8 N/2 cm, preferably 44.6 to 46.5 N/2 cm, in the transverse direction; elongation of 160 to 370%, preferably 268 to 281%, in the machine direction and 160 to 370%, preferably 301-316%, in the transverse direction; and a heat shrinkage of 0.5 to 12.5%, preferably 5.3-5.5%, in the machine direction and −4.5 to 1.5%, preferably −1.3 to −1.8%, in the transverse direction. After removal of the liner, the moisture barrier of the present disclosure can be applied to the object to seal it.

The tensile strength and elongation of the moisture barrier are not particularly limited. The tensile strength of the moisture barrier is preferably not less than 20.64 N/25 mm, more preferably not less than 22.13 N/25 mm. The tensile strength of the moisture barrier material is preferably not more than 28.51 N/25 mm for the flexibility of the moisture barrier material. The elongation at break is preferably not less than 800%, more preferably, not less than 850%. The elongation at break of the moisture-proof material is preferably not more than 913.27% for the workability of the adhesion of the moisture-proof material.

The tensile strength and elongation at break of the moisture barrier material can be measured by a measurement method according to ASTM D3759. The "ASTM D3759" and the like are standards developed by the ASTM INTERNATIONAL.

The weight of the moisture barrier can be easily made small and has a weight per unit area of preferably not more than 702 g/m$^2$, more preferably not more than 579.8 g/m$^2$. When the weight per unit area is not more than 702 g/m$^2$, it can be particularly preferably used as a moisture barrier for transportation vehicles such as airplanes, boats, ships and the like.

The moisture barrier of the present disclosure is used by direct adhesion to an object to be protected from moisture such as a mounting bracket on a floor panel and the like. The adhesive force thereof is preferably not less than 0.22 N/25 mm at room temperature and humidity 50% RH. Such adhesive force can be measured by a measurement method according to ASTM D1000.

The moisture barrier material of the present disclosure does not permit easy moisture permeation and has a water vapor transmission rate of preferably not more than 0.00006355 g/mm$^2$·day, more preferably not more than 0.0000465 g/mm$^2$·day. The water vapor transmission rate can be measured by a measurement method described in ASTM F1249.

While a moisture barrier material used for transportation vehicles such as airplanes, boats, ships and the like is required to show particularly high moisture-proof property, the moisture barrier material of the present disclosure can sufficiently meet the requirement.

The moisture barrier material of the present disclosure shows superior flame retardance. The moisture barrier material of the present disclosure shows an extinguish time of not more than 15 seconds, preferably within 2 to 3.5 seconds, more preferably less than 3 seconds, a burning length of no more than 203 mm, more preferably not more than 61 mm, and a burning time of a fallen burnt material of not more than 5 seconds, and preferably 0 sec, when tested against FAR 25.853 Appendix F Part 1(a)(1)(ii) (flammability test).

In another aspect, as discussed above, the present disclosure provides a method for manufacturing the moisture barrier material including: measuring parameters of the surface to be covered and protected, entering the parameters into a machine to make custom-shaped dies, and shaping the carrier by using the dies in a thermal forming machine to fit the measured parameters. Then, the shaped carrier is coated with an adhesive. A liner can be further applied to the adhesive on the shaped carrier.

Specifically, the method can include shaping the carrier by itself, the carrier coated with the adhesive, or shaping the carrier coated with the adhesive and liner. For example, if a carrier coated with an adhesive is used, the carrier (e.g., polyurethane) is directly coated with the adhesive on a reverse roll coater by wet casting at a speed of 16 feet per minute and drying by use of a 4 zone oven consisting of direct impingement heating nozzles and serpentine heating coils. Then, a release liner such as a silicone-coated polyethyelene film is laminated to the adhesive side before winding into a roll. If a carrier with the adhesive and liner is used, the carrier with the adhesive is manufactured in the same manner, but the release liner is peeled/removed and the adhesive is laminated with the liner, such as a silicone-treated PVC liner.

In one aspect, the carrier is thermoformed by application of direct heat via electric coils at a temperature between 232-260° C. for 20-30 seconds before inserting a die of the desired shape into the softened material and vacuum forming to shape. The cooled carrier is then removed from the die and retains its shape. In this aspect, the method can include shaping the carrier by itself, the carrier coated with the adhesive, or shaping the carrier coated with the adhesive and liner.

In another aspect, the method includes forming a flat die with a custom shape, and using the flat die to shape a planar carrier sheet. Instructions, markings, and/or indentations to fold the sheet into a particular shape are provided to form the moisture barrier of the present disclosure. Alternatively, the carrier can be 3D printed into a planar shape that can then be folded into the desired shape.

The moisture barrier material of the present disclosure can be shaped into any desired non-planar form. Examples of a non-planar shape are a cube, three dimensional rectangle (rectangular prism), three dimensional oval and dome that is flat on one side. Preferably, the non-planar shape is a three-dimensional rectangle. The shaped moisture barrier material is applied to the non-planar surface that it was thermally shaped for via the adhesive by removing the stretchable liner and applying the barrier to the surface.

The die used to shape the moisture barrier material is formed of a rigid material. Examples include steel, plastic, polycarbonate, wood, and aluminum. Preferably, aluminum is used. In another embodiment, the die can be made using 3D printing into a custom shape and used to thermally form the moisture barrier material.

EXAMPLES

The present invention is explained in more detail in the following by referring to the Examples. The embodiments of the moisture barrier material used in the Examples are in a flat shape (i.e., tape). The evaluation tests of the moisture barrier material in the Examples were performed by the following methods.

1. Adhesive Force

According to ASTM D1000, under the conditions of rolling a 2 kg roller ten times in each direction over the length of the tape and allowing the tape to dwell at 24 C±5 C and 50%±5% relative humidity for 48 hours±4 hrs prior to peeling at 180 degree angle at a rate of 305 mm/minute, a 180° peel strength was measured, and the 180° peel strength was taken as the adhesive force. As the adherend, a honeycomb adherend (Gillfloor™ 4417 from The Gill Corporation) and an aluminum adherend (2024 grade) were used.

In addition, a sample of the moisture barrier tape was cut (length 10 inches×width 1 inch), and a 180° peel strength was measured under the conditions of room temperature (24° C.±5)×humidity 50%±5 RH to determine the adhesion of the adhesive to the liner. The 180° peel strength was taken as the adhesive force to the liner.

2. Tensile Strength and Elongation at Break

Measured according to ASTM D3759.

To be specific, tensile strength and elongation at break were measured under the conditions of 12.5 mm sample width, 152 mm sample length, distance between chucks 50 mm, tension speed 50 mm/min.

3. Flammability Test

Performed According to FAR 25.853 Appendix F Part 1 (a) (1) (ii)

To be specific, one terminal portion of a sample cut in the longitudinal direction into a tape (length 305 mm×76.2 mm width) was fixed and suspended in the vertical direction, the other terminal portion in the longitudinal direction was contacted with a flame for 12 seconds, and the (1) burning time, (2) burning length, and (3) burning time of fallen burnt material were measured. As the adherend, honeycomb adherends (Gillfloor™ 4417 and Gillfloor™ 4709, both from The Gill Corporation) were used, in addition to testing the moisture barrier material as a standalone product.

4. Water Vapor Transmission Rate

Measured according to ASTM F1249.

To be specific, an apparatus (Mocon Permatran-W 3-61 MN) having two chambers (inside and outside chambers) separated by a sample of the moisture barrier material is used. The outside chamber contains an environment at a temperature of 38° C.±1° C. with 100% relative humidity air flowing and the inside chamber contains a dry flow of nitrogen gas (flow rate of 10.0 to 10.5 sccm). The flowing nitrogen gas picks up any water molecules permeating through the sample and detects them with a sensor. The units are grams of water permeating through a 1 $mm^2$ area of film per day (g/$mm^2$·day).

Examples

Adhesive 100 parts by weight of a combination of a styrene-isoprene/styrene-butadiene copolymer (DC-14044 manufactured by Royal Adhesives and Sealants) and a styrene-isoprene polymer (SIS 5516 manufactured by LCY Elastomers LP) is mixed with 33.4 parts by weight of a combination of tricresyl phosphate (manufactured by Rit-Chem Co., Inc.) and chlorinated paraffin (Paraoil 63-NR manufactured by Dover chemical Corporation) with 48.1 parts by weight of toluene to prepare an adhesive.

Carrier

As the carrier, Dureflex® X2313 NAT manufactured by Bayer MaterialScience LLC having a thickness of 16-17.6 mil was used.

Liner

As the liner, a polyvinyl chloride substrate with a silicone-release treatment having a cumulative thickness of 0.07 mm was used.

Examples 1, 2 and 3

Moisture barriers including the carrier, adhesive and liner were prepared, and the tensile strength and the elongation at break were measured. The obtained moisture barrier was subjected to the aforementioned tests. The results are shown in Table 1.

TABLE 1

| Test | | | Units | Example 1 | Example 2 | Example 3 |
|---|---|---|---|---|---|---|
| Area Weight | | | g/$m^2$ | 579.79 | 573.68 | 579.79 |
| Adhesion-Liner | | | N/25 mm | 0.0248 | 0.0279 | 0.0162 |
| Adhesion-Aluminum (2024) | | | N/25 mm | 0.5133 | 0.5156 | 0.4691 |
| Adhesion-Honeycomb (Gillfloor ™ 4417) | | | N/25 mm | 0.4448 | 0.4669 | 0.4337 |
| Tensile Strength | | | N/25 mm | 24.80 | 25.00 | 25.58 |
| Elongation | | | % | 878.11 | 873.12 | 867.33 |
| Water Vapor Transmission Rate | | | g/$mm^2$ · day | 0.0000428 | 0.0000430 | 0.0000448 |
| Flammability | Tape | Extinguish Time | Seconds | 2.5 | 2.3 | 2.3 |
| | | Burn Length | mm | 109.33 | 110.83 | 119.00 |
| | | Drip Extinguish Time | seconds | 0.5 | 0.5 | 0.5 |
| | Gillfloor ™ 4417 | Extinguish Time | seconds | 2.9 | 2.7 | 2.7 |
| | | Burn Length | mm | 34.83 | 33.00 | 38.67 |
| | | Drip Extinguish Time | seconds | 0 | 0 | 0 |

TABLE 1-continued

| Test | | Units | Example 1 | Example 2 | Example 3 |
|---|---|---|---|---|---|
| Gillfloor ™ 4709 | Extinguish Time | seconds | 2.7 | 2.6 | 2.5 |
| | Burn Length | mm | 42.83 | 40.17 | 44.00 |
| | Drip Extinguish Time | seconds | 0 | 0 | 0 |

What is claimed:

1. A moisture barrier material comprising:
a thermoplastic carrier layer having a top surface and a bottom surface;
an adhesive layer formed on the bottom surface of the carrier layer; and
a liner covering the entirety of a bottom surface of the adhesive layer;
wherein the thermoplastic carrier layer, the adhesive layer and the liner together have a three-dimensional, non-planar shape, and the three-dimensional, non-planar shape is retained by the carrier layer and the adhesive layer when the liner is removed to expose the adhesive layer,
the tensile strength of the moisture barrier material is not less than 20.64 N/25 mm, and
the elongation at break of the moisture barrier material is not less than 800%;
wherein the thermoplastic carrier layer, the adhesive layer and the liner together have a water vapor transmission rate of not more than 0.00006355 g/mm$^2$·day.

2. The moisture barrier material of claim 1, wherein the three-dimensional, non-planar shape is specific to an object requiring protection from moisture.

3. The moisture barrier material of claim 1, wherein the adhesive layer comprises:
a heat resistant adhesive selected from the group consisting of natural rubber adhesive, synthetic rubber adhesive, polyurethane adhesive, acrylic adhesive, silicone adhesive, and hot-melt adhesive.

4. The moisture barrier material of claim 3, wherein the adhesive layer further comprises:
a flame retardant.

5. The moisture barrier material of claim 1, wherein the thickness of the adhesive layer is between 0.0127 mm and 0.127 mm and the thickness of the carrier is between 0.0508 mm and 0.635 mm.

6. A moisture barrier material comprising:
a thermoplastic carrier layer having a top surface and a bottom surface;
an adhesive layer formed on the entirety of the bottom surface of the carrier layer; and
a liner disposed over the entirety of a bottom surface of the adhesive layer and, when the liner is so disposed, each of the thermoplastic carrier layer, the adhesive layer and the liner has an identical three-dimensional, non-planar shape,
wherein the three-dimensional shape is retained by the carrier layer and the adhesive layer when the liner is no longer disposed over the adhesive layer,
the tensile strength of the moisture barrier material is not less than 20.64 N/25 mm, and
the elongation at break of the moisture barrier material is not less than 800%;
wherein the thermoplastic carrier layer, the adhesive layer and the liner together have a water vapor transmission rate of not more than 0.00006355 g/mm$^2$·day.

7. The moisture barrier material of claim 6, wherein the three-dimensional, non-planar shape is specific to an object requiring protection from moisture.

8. The moisture barrier material of claim 6, wherein the adhesive layer comprises:
a heat resistant adhesive selected from the group consisting of natural rubber adhesive, synthetic rubber adhesive, polyurethane adhesive, acrylic adhesive, silicone adhesive, and hot-melt adhesive.

9. The moisture barrier material of claim 8, wherein the adhesive layer further comprises:
a flame retardant.

10. The moisture barrier material of claim 6, wherein the thickness of the adhesive layer is between 0.0127 mm and 0.127 mm and the thickness of the carrier is between 0.0508 mm and 0.635 mm.

11. A moisture barrier material comprising:
a carrier layer having a top surface and a bottom surface;
an adhesive layer formed on the entire bottom surface of the carrier layer; and
a removable liner disposed over a bottom surface of the adhesive layer,
wherein the three layers comprising the moisture barrier material have a three-dimensional, non-planar shape,
the carrier layer and adhesive layer have the same three-dimensional, non-planar shape after the liner is removed,
the tensile strength of the moisture barrier material is not less than 20.64 N/25 mm, and
the elongation at break of the moisture barrier material is not less than 800%;
wherein the thermoplastic carrier layer, the adhesive layer, and the liner together have a water vapor transmission rate of not more than 0.00006355 g/mm$^2$·day.

12. The moisture barrier material of claim 11, wherein the three-dimensional, non-planar shape is specific to an object requiring protection from moisture.

13. The moisture barrier material of claim 11, wherein the adhesive layer comprises:
a heat resistant adhesive selected from the group consisting of natural rubber adhesive, synthetic rubber adhesive, polyurethane adhesive, acrylic adhesive, silicone adhesive, and hot-melt adhesive.

14. The moisture barrier material of claim 13, wherein the adhesive layer further comprises:
a flame retardant.

15. The moisture barrier material of claim 11, wherein the thickness of the adhesive layer is between 0.0127 mm and 0.127 mm and the thickness of the carrier is between 0.0508 mm and 0.635 mm.

* * * * *